Patented Nov. 16, 1937

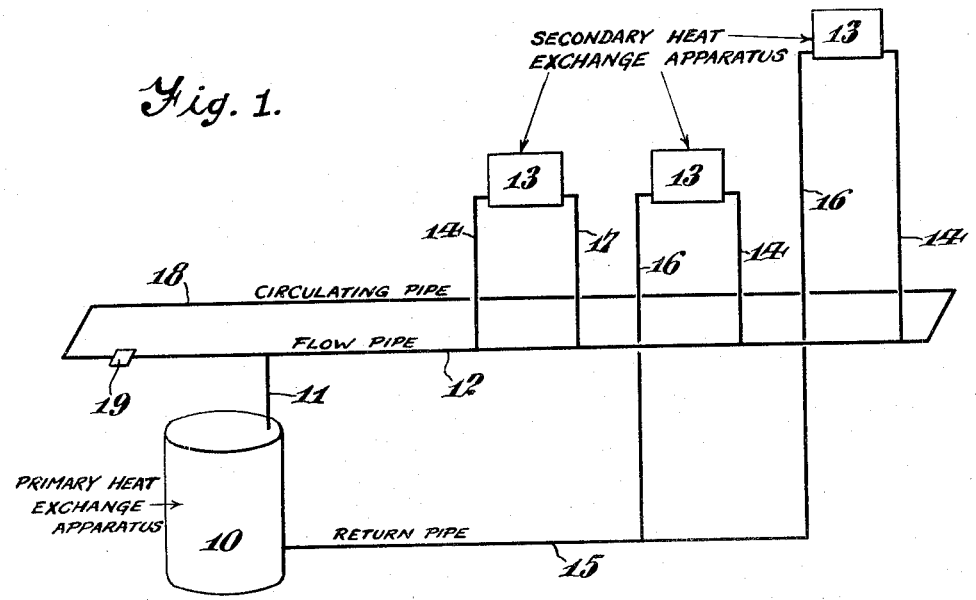
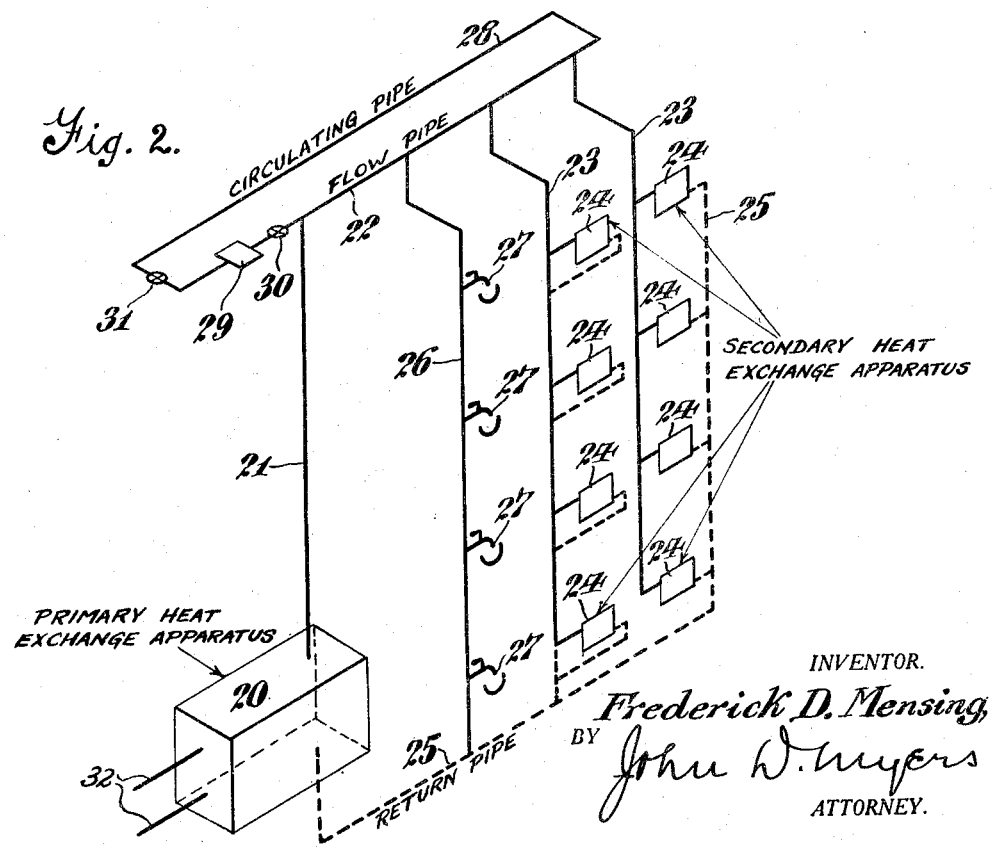

2,099,310

UNITED STATES PATENT OFFICE 2,099,310

HEAT EXCHANGE SYSTEM

Frederick D. Mensing, Philadelphia, Pa.

Application February 3, 1934, Serial No. 709,560

10 Claims. (Cl. 237—63)

The invention relates to heat exchange systems, and involves a method and apparatus for circulating the liquid heat transfer medium in such systems.

In the operation of heat exchange systems various methods have been employed heretofore to effect the circulation of a liquid heat transfer medium through the entire system of heat exchange apparatus such as heating or cooling devices, flow pipes, heat emitting or absorbing devices and return pipes, and to liquid withdrawing devices. With the methods heretofore known, the mechanical circulating systems which have been used have been so operated as to necessitate a forced circulation throughout the entire heat exchange system, through the primary heat exchange apparatus, or through the secondary heat exchange apparatus. In any such system a relatively large amount of liquid must be circulated, and, as a consequence, a relatively large amount of power is required to maintain the forced circulation.

In the various systems heretofore known, both gravity and mechanical means have been utilized for effecting the circulation of either hot or cold liquids. In one type of system wherein mechanical means is employed for effecting forced circulation, the system is of such a character that, to all intents and purposes, there is no circulation when the circulating device is not in operation, that is, the system will not operate by gravity alone. In another type of forced circulating system, the circulating device is of such a character as to permit circulation of the liquid, as by the passage of the liquid through a propelling member, when the mechanical means is not in operation. When an auxiliary circulating device is installed in the piping of a gravity operated system, the friction resulting therefrom is such as to substantially impede the gravitational flow. All such auxiliary circulating devices function to circulate the liquid throughout the entire system, including the heat exchange apparatus and the connecting piping, and substantially all the liquid in the system is circulated by the circulating device when it is in operation.

One of the objects of the present invention is the provision, in a heat exchange system employed for either heating or cooling purposes, of an auxiliary circulating system whereby the flow of the liquid heat transfer medium between the primary heat exchange apparatus and the secondary heat exchange apparatus may be accelerated without any substantial effect upon the flow through the primary heat exchange apparatus, or the secondary heat exchange apparatus and its connecting piping.

Another object of the invention is the provision, in a heat exchange system, of a method and apparatus whereby a minimum drop in the temperature of a liquid heat transfer medium may be maintained between the primary heat exchange apparatus and the secondary heat exchange apparatus.

A further object of the invention is the provision, in a heat exchange system utilizing a liquid heat transfer medium, of a method and apparatus whereby the secondary heat exchange apparatus, such as heat emitting appliances or heat absorbing appliances, may be fed from a source of substantially uniform temperature.

It is another object of the invention to provide, in a heat exchange system utilizing a liquid heat transfer medium, a method and apparatus whereby the lag in heating or cooling the secondary heat exchange apparatus furthest from the primary heat exchange apparatus may be avoided.

Another object of the invention is the provision of a rapid circulation of the liquid heat transfer medium from the primary heat exchange apparatus through the flow line to the branch supply pipes for the secondary heat exchange apparatus without affecting the normal circulation of the medium through the primary heat exchange apparatus, or the secondary heat exchange apparatus and the piping therefor, and without necessitating the undue consumption of power incident to the mechanical circulating systems heretofore known.

A still further object of my invention is the provision, in a heat exchange system utilizing a liquid heat transfer medium, of a method and apparatus whereby the above mentioned objects may be accomplished without in any way obstructing or interfering with the normal operation of the system in which my improvement is installed.

In accordance with my invention, the above objects are accomplished by moving a small quantity of liquid through the flow line of the system, or a portion of the flow line, and through an auxiliary circulating line preferably arranged to connect the opposite ends of the flow line to thus provide a closed circulating circuit, the movement of liquid through the closed circulating circuit being maintained by means of a pump or other suitable liquid circulating device.

The principle of my invention, together with a suitable arrangement of means for practicing the same, is illustrated diagrammatically by the accompanying drawing wherein:

Fig. 1 illustrates the application of my improvement to an ordinary under-feed hot water heating system; and Fig. 2 illustrates the application of my improvement to a down-feed circulating system which may be utilized for circulating liquid in a heating system, a cooling system, or a system from which liquid, either hot or cold, may be withdrawn.

Except for the embodiment of my improvement therein, the system illustrated in Fig. 1 comprises a primary heat exchange apparatus such as a boiler or other device 10 for heating a liquid heat transfer medium, a flow pipe including a vertical portion 11 and a horizontal portion 12 for conveying the heated liquid from the heating device 10 to suitable secondary heat exchange apparatus, such as heat emitting appliances 13, connected to the flow pipe by means of branch supply pipes 14, and a return pipe 15 and branch return pipes 16 through which the heat transfer medium is returned to the heating device 10 from the heat emitting appliances 13. As is well understood, such heat emitting appliances may connect to the flow pipe through branch returns such as shown at 17. Such a system may be wholly gravity operated, or suitable mechanical means may be employed therein, either alone or in conjunction with gravity, for producing a more rapid circulation of the liquid heat transfer medium through the entire system, that is, through the heating device, the piping, and the heat emitting appliances, where a forced circulation is desired.

With a gravity operated system the flow of the liquid heat transfer medium from the heating device through the main flow pipe to the heat emitting appliances is comparatively slow, and, as a consequence, there is a substantial drop in the temperature of the heat transfer medium between the heating device and the branch supply pipes leading to the heat emitting appliances. Although it is not unusual to incorporate in such a system some form of mechanical means for producing a forced circulation, such mechanical means is required to move the entire volume of the liquid heat transfer medium in the system, that is, through the heating device, the flow pipe, the branch supply pipes, the heat emitting appliances and the return pipe, and the power necessary to effect such a movement of the liquid is of considerable consequence.

In order to accelerate the flow of the heat transfer medium through the flow pipe 12 between the heating device 10 and the branch supply pipes 14 leading to the heat emitting appliances 13 and thereby minimize the temperature drop in the heat transfer medium between the heating device and the heat emitting appliances, I provide a closed circulating circuit comprising the main flow pipe, or a substantial portion thereof such as the horizontal portion 12, and a circulating pipe 18 preferably connecting the opposite ends of the flow pipe 12. It will be understood, however, that the delivery end of the circulating pipe 18 may connect to other points in the system such as the vertical flow pipe 11, or the upper portion of the heating device 10. Circulation of the liquid heating medium through the closed circuit is induced by means of a pump or other suitable circulating device 19 connected in the circulating pipe 18 preferably near the junction of the terminus of the circulating pipe 18 with the flow pipe 12. The circulating pipe 18 may be of a size less than the size of the flow pipe 12.

Inasmuch as the capacity of the pump need only be such as to move a portion of the liquid heat transfer medium through the circulating circuit, a minimum of power is required for the operation of my improvement, and this power is necessarily much less than the power required for providing a forced circulation throughout the entire system. Furthermore, the circulating device does not interfere with the normal flow of the heat transfer liquid, whether such normal flow in the system be induced by gravity or by mechanical means or by both.

Where my improvement is embodied in a down-feed liquid circulating system such as that illustrated in Fig. 2 of the drawing, the liquid heat transfer medium may be delivered from the primary heat exchange apparatus 20 through the vertical portion 21 of the flow pipe in any suitable manner, either gravitational or mechanical, and the medium is then conveyed through the horizontal portion 22 of the flow pipe to the branch supply pipes 23. The branch supply pipes may conduct the heat transfer medium to secondary heat exchange apparatus 24, whence it is returned to the primary heat exchange apparatus 20 through the return pipe 25, or the liquid heat transfer medium may be delivered to the branch supply pipe 26 for supplying a medium such as hot or cold water to withdrawing devices 27. In case withdrawing devices are utilized in such a system, it will be understood that suitable means should be provided, such as supply pipes 32, for replenishing the liquid which is withdrawn.

In order to accelerate the flow of the heat transfer medium in the horizontal portion 22 of the flow pipe, the ends of this portion may be connected through the circulating pipe 28 which, as indicated above, may be of a smaller size than the horizontal flow pipe. Although it may be connected otherwise as indicated above in the description of the system illustrated in Fig. 1, the extreme end of the circulating pipe 28 is preferably connected to the horizontal flow pipe 22 at a point near the junction of the vertical portion 21 therewith, and a pump or other circulating device 29 is connected in the circulating pipe 28 adjacent this junction. If desired, a valve 30 or other suitable means may be placed in the circulating pipe 28 between the circulating device 29 and the junction of the terminal of the circulating pipe with the horizontal flow pipe 22 for controlling flow of liquid in the closed circulating circuit. It may also be desirable to place a valve 31 in the circulating pipe on the opposite side of the circulating device in order that the circulating circuit may be closed off entirely to permit the pump to be repaired or removed, or to discontinue the circulation of the liquid in the auxiliary circuit.

As heretofore pointed out, the capacity of the circulating device need be sufficient only to move the liquid heat transfer medium through the closed circulating circuit, and this circulation is effected independently of the circulation of the heat transfer medium through the primary heat exchange apparatus, the branch supply pipes, the secondary heat exchange apparatus or withdrawing devices, and the return pipe. The system therefore operates to accelerate the flow of the liquid between the heating device or other primary heat exchange apparatus and the heat emitting devices or other secondary heat exchange apparatus so that this flow is greater than the normal flow in the flow pipe whether the normal flow is induced by gravity or by mechanical means. As a result of this accelerated flow between the primary heat exchange apparatus and the secondary heat exchange apparatus the drop in the temperature of the liquid between the primary and secondary exchange apparatus is reduced, and this decreased drop in temperature is obtained with an expenditure of energy much less than would be required to move the entire quantity of liquid by the use of mechanical means for circulating the liquid through the entire system.

My auxiliary circulating system, when incorporated in any ordinary heat exchange system in the manner herein described, operates to overcome the friction head in the flow line of the old system and the total head in the circulating line of the new system. The ultimate effect, therefore, is substantially that which would be obtained if the heating device or other primary heat exchange apparatus were movable into such positions with respect to the secondary heat exchange apparatus as to eliminate the horizontal portion of the flow line from the system.

I have illustrated my improvement in connection with ordinary types of hot water heating systems utilizing heating devices and heat emitting appliances such as radiators, and water withdrawing devices. It will be understood, however, that the improvement is equally applicable to cooling systems and systems from which cold water or other liquid is withdrawn. Inasmuch as the operation of systems wherein a cold liquid is circulated does not differ essentially from the operation of the systems illustrated diagrammatically herein, a further showing thereof is believed to be unnecessary. It will be understood, therefore, that the terms "heat exchange system", "primary heat exchange apparatus", "secondary heat exchange apparatus" and "withdrawing devices" are to be interpreted broadly to include either heating systems, cooling systems, or systems for circulating hot or cold liquids, so long as they operate in accordance with the principle herein described.

Having thus described my invention, what I claim and desire to secure by Letters Patent is:

1. The method of circulating the liquid heat transfer medium in a gravity operated heat exchange system having a primary heat exchange apparatus, a secondary heat exchange apparatus, means including a horizontal flow pipe for conducting the medium from the primary heat exchange apparatus to the secondary heat exchange apparatus, and a return pipe for conducting the medium from the secondary heat exchange apparatus to the primary heat exchange apparatus, which consists in superimposing upon the gravitational head in a portion of the flow pipe a force sufficient to substantially accelerate the flow of the medium therein while maintaining gravitational flow through the return pipe.

2. In a heat exchange system, primary heat exchange apparatus, a flow pipe, including a horizontal portion for conveying a heat transfer medium therefrom, a return pipe for conveying the medium thereto, secondary heat exchange apparatus connected between the flow pipe and the return pipe, a circulating pipe connected between the opposite ends of the said horizontal portion to provide therewith a closed circuit, and means connected in said circulating pipe for inducing flow of said medium in said closed circuit to accelerate the flow of said medium between the primary heat exchange apparatus and the secondary heat exchange apparatus.

3. In a gravity heat exchange system, primary heat exchange apparatus, means, including a flow pipe, for conveying a liquid heat transfer medium therefrom, a circulating pipe connecting the opposite ends of the flow pipe to provide therewith a closed circulating circuit, return pipping for conveying the heat transfer medium to the primary heat exchange apparatus, secondary heat exchange apparatus connected between the flow pipe and the return piping, and means in the circulating pipe for circulating the heat transfer medium in the closed circuit to accelerate the gravitational flow of the medium between the primary heat exchange apparatus and the secondary heat exchange apparatus through the flow pipe.

4. In a heat exchange system, a primary heat exchange apparatus, a secondary heat exchange apparatus, a gravity operated circuit connecting said primary heat exchange apparatus and said secondary heat exchange apparatus for conveying a liquid heat transfer medium from one heat exchange apparatus to the other, and means operating independently of said primary heat exchange apparatus and said secondary heat exchange apparatus to accelerate directly the flow of said medium in a portion only of said circuit between said primary heat exchange apparatus and said secondary heat exchange apparatus.

5. In a heat exchange system having a heat supplying device, a heat emitting device, and means including a horizontal flow pipe for conveying a liquid heat transfer medium between said supplying device and said emitting device, means for accelerating the flow of the liquid heat transfer medium between said supplying device and said emitting device comprising a closed circulating circuit including a portion of said flow pipe and a by-pass for a portion of the liquid heat transfer medium around said heat supplying device, and means in said by-pass for inducing flow of the heat transfer medium in said circulating circuit.

6. In a heat exchange system having a heat supplying device, a heat emitting device, means, including a flow pipe, for conveying a liquid heat transfer medium between said supplying device and said emitting device, means for returning the heat transfer medium from said heat emitting device to said heat supplying device, a closed circulating circuit including a portion of said flow pipe and a by-pass around said heat supplying device, means in said by-pass for inducing flow of said transfer medium in said circulating circuit, and means in said closed circuit for controlling the flow therein.

7. In a hot water heating system, a water heating device, a heat emitting appliance, means, including a flow pipe, for conveying the heated water between said heating device and said emitting appliance, a return pipe for conveying the water from said emitting appliance to said heating device, a circulating pipe connecting the end of said flow pipe distant from said heating device to the opposite end of said flow pipe, and means operating independently of said heating device to induce circulation of the water in said system through said flow pipe and said circulating pipe.

8. In a gravity heating system, a heating device for heating a liquid heat transfer medium, a heat emitting appliance, means, including a flow pipe, for conveying the heat transfer medium from said device to said appliance, a return pipe for conveying the heat transfer medium from said appliance to said device, a circulating pipe connecting the opposite ends of said flow pipe, and means in said circulating pipe for inducing circulation of said heat transfer medium through said flow pipe and said circulating pipe.

9. In a hot water system, a water heating device, a flow pipe, including a horizontal portion, for transferring hot water from said heating device to a water withdrawing device, a return pipe for returning water from said withdrawing device to said heating device, a closed circulating circuit including said horizontal portion and a by-pass around said heating device, and means in said by-pass for circulating water in said circulating circuit to accelerate the flow of water from said heating device to said withdrawing device.

10. In a hot water system, a water heating device, a gravity operated flow circuit for transferring hot water from said heating device to a water withdrawing device and returning it to said heating device, said flow circuit including a horizontal portion through which the water flows from said heating device to said withdrawing device, a closed circulating circuit including a by-pass around said heating device and said horizontal portion, and means in said by-pass, operating independently of gravity, for circulating water in said circulating circuit.

FREDERICK D. MENSING.